(12) United States Patent
Hsu

(10) Patent No.: US 7,479,989 B2
(45) Date of Patent: Jan. 20, 2009

(54) METHOD FOR CHROMA UPSAMPLING WITH LUMA REFERENCE

(75) Inventor: Jung-Chung Hsu, Tainan County (TW)

(73) Assignee: Himax Technologies Limited, Fonghua Village, Sinshih Township, Tainan County (TW)

( * ) Notice: Subject to any disclaimer, the term of this patent is extended or adjusted under 35 U.S.C. 154(b) by 406 days.

(21) Appl. No.: 11/463,588

(22) Filed: Aug. 9, 2006

(65) Prior Publication Data
US 2007/0257991 A1    Nov. 8, 2007

(30) Foreign Application Priority Data
May 8, 2006  (TW) .............................. 95116285 A

(51) Int. Cl.
*H04N 5/228*  (2006.01)
(52) U.S. Cl. .................... 348/222.1; 382/167

(58) Field of Classification Search ............ 348/222.1, 348/450, 453; 382/167
See application file for complete search history.

(56) References Cited
U.S. PATENT DOCUMENTS

| 6,297,801 B1 | 10/2001 | Jiang |
| 6,628,827 B1* | 9/2003 | Acharya .................... 382/167 |
| 2005/0030422 A1* | 2/2005 | Leone et al. ................ 348/441 |

\* cited by examiner

*Primary Examiner*—David L Ometz
*Assistant Examiner*—Akshay Trehan
(74) *Attorney, Agent, or Firm*—Winston Hsu

(57) ABSTRACT

Chroma upsampling is performed by setting a chroma of a target pixel according to luma of neighboring pixels. When a luma of the target pixel differs from the luma of both of the reference pixels, the chroma of the target pixel is set to a value of $(k*C1+(m-k)*C3+m/2)$ shifted n bits to the right. In this formula, n is an integer, m is equal to $2^n$, and k is equal to $\{0 \sim m, \min(abs(abs(Y1-Y2)*k-abs(Y2-Y3)*(m-k)))\}$. Since luma are considered, and a precise calculation is used in this method, the calculations required are simplified and reduced, and video quality is improved.

11 Claims, 5 Drawing Sheets

METHOD FOR CHROMA UPSAMPLING WITH LUMA REFERENCE

BACKGROUND OF THE INVENTION

1. Field of the Invention

The present invention relates to methods of chroma upscaling, and particularly to a method of setting a chroma of a pixel according to a luma of a reference pixel, which does not require a division operation to set a target pixel's chroma.

2. Description of the Prior Art

Signal processing technology improves daily, and customer requirements for video quality increase daily. However, in traditional video technology, because signal processing speed is relatively slow, and transmission bandwidth is limited, most technologies adopt a data format in which every pixel contains luma information, but only pixels in every other row contain chroma information. In order to satisfy customer requirements for video quality, media players in the current market typically perform a chroma upsampling process on the video data formatted as mentioned above before playing.

Typical chroma upscaling techniques employ a finite impulse response (FIR) method to interpolate pixel chroma information. Please refer to FIG. 1. An image frame 10 shown in FIG. 1 comprises three neighboring pixels 11, 12, 13 located in a same row. In raw video data, each of the three pixels 11, 12, 13 comprises respective luma information Y1, Y2, Y3. However, only the pixel 11 and the pixel 13 comprise respective chroma information C1, C3. The pixel 12 does not comprise chroma information. In FIG. 1, the pixel 11 and the pixel 13 are filled with diagonal lines to show that they comprise chroma information. Taking the pixel 12 as a target pixel for chroma upscaling, and taking the pixel 11 and the pixel 13 as reference pixels, when performing a second order FIR interpolation method, a chroma C21 of the target pixel 12 is based on the respective chroma information C1, C3 of the reference pixel 11 and the reference pixel 13, and set by the following formula:

$$C21=(C1+C3+1)/2$$

The chroma C21 represents the chroma of the pixel 12, which is determined by the chroma upscaling method of the prior art.

Please refer to FIG. 2. FIG. 2 is a graph showing distribution of the luma information Y1, Y2, Y3 and the chroma information C1, C21, C3 for the three pixels in FIG. 1 following the above chroma upscaling method. In general, for video data, a trend in chroma change between neighboring pixels is very similar to a trend in luma change between the neighboring pixels. However, FIG. 2 clearly shows that, where the luma Y2 and the luma Y3 are equal, after chroma upscaling, the interpolated chroma C21 is lower than the chroma C3, which is a different trend from the lumas Y1, Y2, Y3. Therefore, the prior art method described above for chroma upscaling of video data often produces a chroma change trend that does not match the respective luma change trend, causing sub-optimal video quality.

Because in video data, the trend in chroma change between neighboring pixels typically matches the relative trend in luma change of the neighboring pixels, the prior art provides a chroma upscaling method which sets a weight of the reference pixel chroma based on a luma gradient of the reference pixel, then sets the target pixel chroma based on the reference pixel chroma and weight, thus completing chroma upscaling. This can be seen in U.S. Pat. No. 6,297,801, where Hong Jiang's "Edge-Adaptive Chroma Up-Conversion" describes this chroma upscaling method. However, because the trend in luma change between the reference pixel and the target pixel is used to set the reference pixel chroma and weight, a high number of division operations are required, which requires a calculations burden that is not worth implementing in video hardware.

SUMMARY OF THE INVENTION

It is therefore a primary objective of the present invention to provide a chroma upscaling method that sets a target pixel chroma based on a luma of a reference pixel and an improved calculation that is simpler to implement in hardware, solving the problems mentioned in the above description of the prior art.

The present invention describes a method of chroma upscaling. The method of chroma upscaling provided comprises comparing a first reference pixel luma Y1 and a target pixel luma Y2 for equality, and comparing a second reference pixel luma Y3 and the target pixel luma Y2 for equality. When the target pixel luma Y2 and the first reference pixel luma Y1 are not equivalent, and the target pixel luma Y2 and the second reference pixel luma Y3 are also not equivalent, a target pixel chroma C2 is set based on a first reference pixel chroma C1 and a second reference pixel chroma C3, as:

$$C2=(k*C1+(m-k)*C3+m/2)$$

and shifted n bits to the right, where n is a positive integer, $m=2^n$ and $k=\{0\sim m, \min(abs(D1*k-D2*(m-k)))\}$, where D1 is the absolute difference of the first reference pixel luma Y1 and the target pixel luma Y2, and D2 is the absolute difference of the target pixel luma Y2 and the second reference pixel luma Y3.

The present invention provides another chroma upscaling method. The chroma upscaling method of the present invention comprises comparing a first reference pixel luma Y1 and a target pixel luma Y2 for equality, and comparing a second reference pixel luma Y3 and the target pixel luma Y2 for equality. If the first reference pixel luma Y1 is not equal to the target pixel luma Y2, and the target pixel luma Y2 is not equal to the reference pixel luma Y3, then based on the first reference pixel chroma C1 and the second reference pixel chroma C3, the target pixel chroma C2 is set to:

$$C2=(D2*C1+D1*C3+(D1+D2)/2)/(D1+D2)$$

where D1 is the absolute difference of the first reference pixel luma Y1 and the target pixel luma Y2, and D2 is the absolute difference of the target pixel luma Y2 and the second reference pixel luma Y3.

These and other objectives of the present invention will no doubt become obvious to those of ordinary skill in the art after reading the following detailed description of the preferred embodiment that is illustrated in the various figures and drawings.

DETAILED DESCRIPTION

Owing to the fact that pixel-to-pixel chroma variance and pixel-to-pixel luma variance typically follow the same trend, in the chroma upscaling method of the present invention, a reference pixel chroma weight is set based on a reference pixel luma and a relationship between the reference pixel and a target pixel, then the target pixel chroma is set based on a reference pixel chroma and the reference pixel chroma weight to accomplish chroma upscaling.

Figure 1:
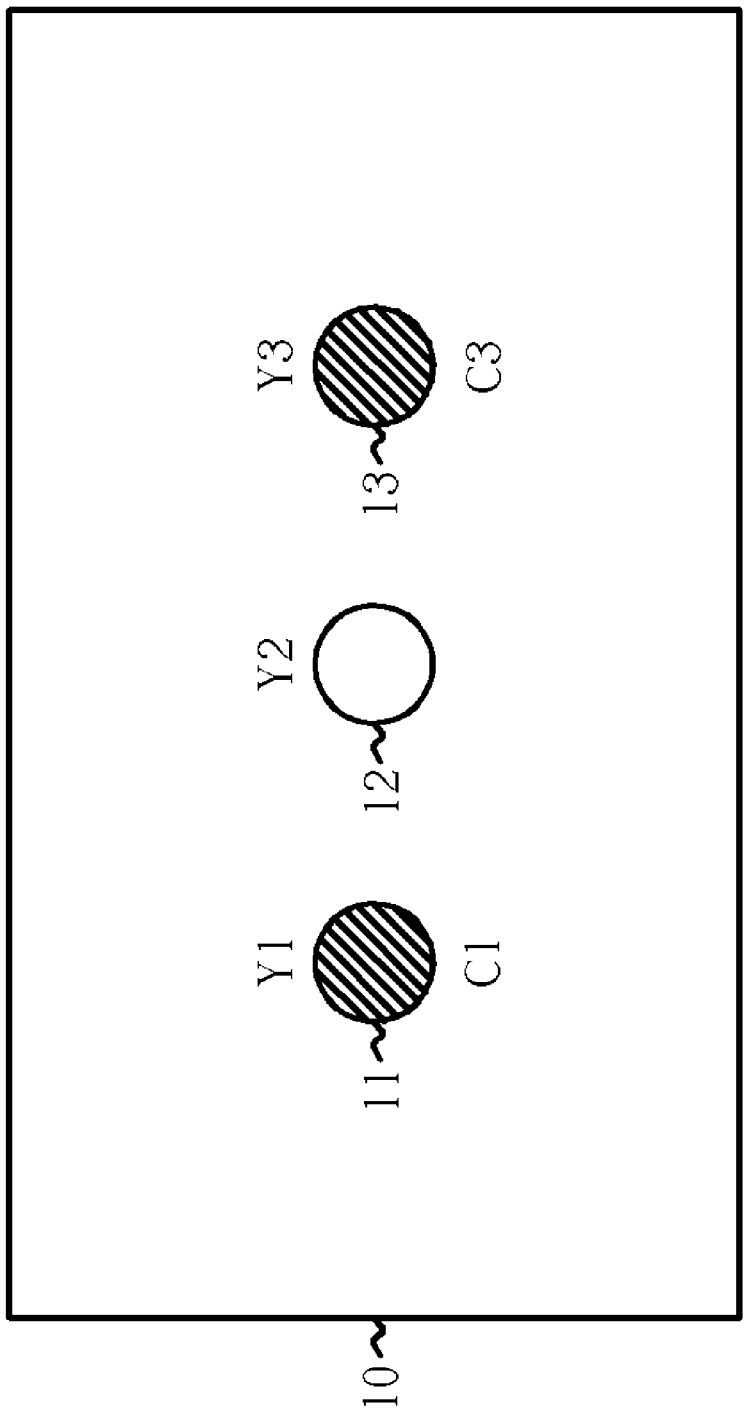
FIG. 1 is a frame that contains three neighboring pixels in a row.
Figure 2:
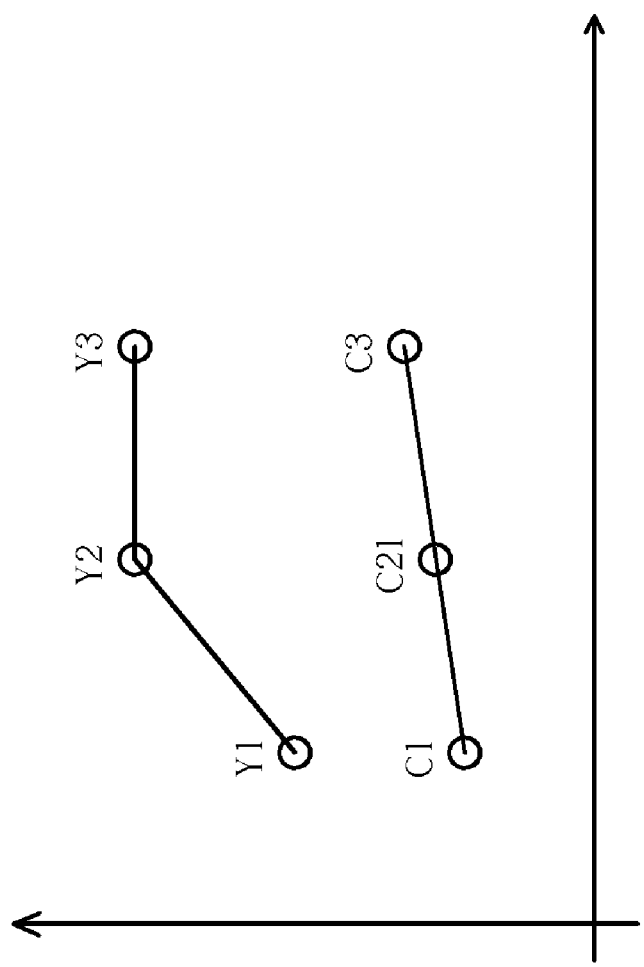
FIG. 2 is a graph of a luma of three pixels and a chroma of three pixels after chroma upscaling per the method of the prior art.
Figure 3:
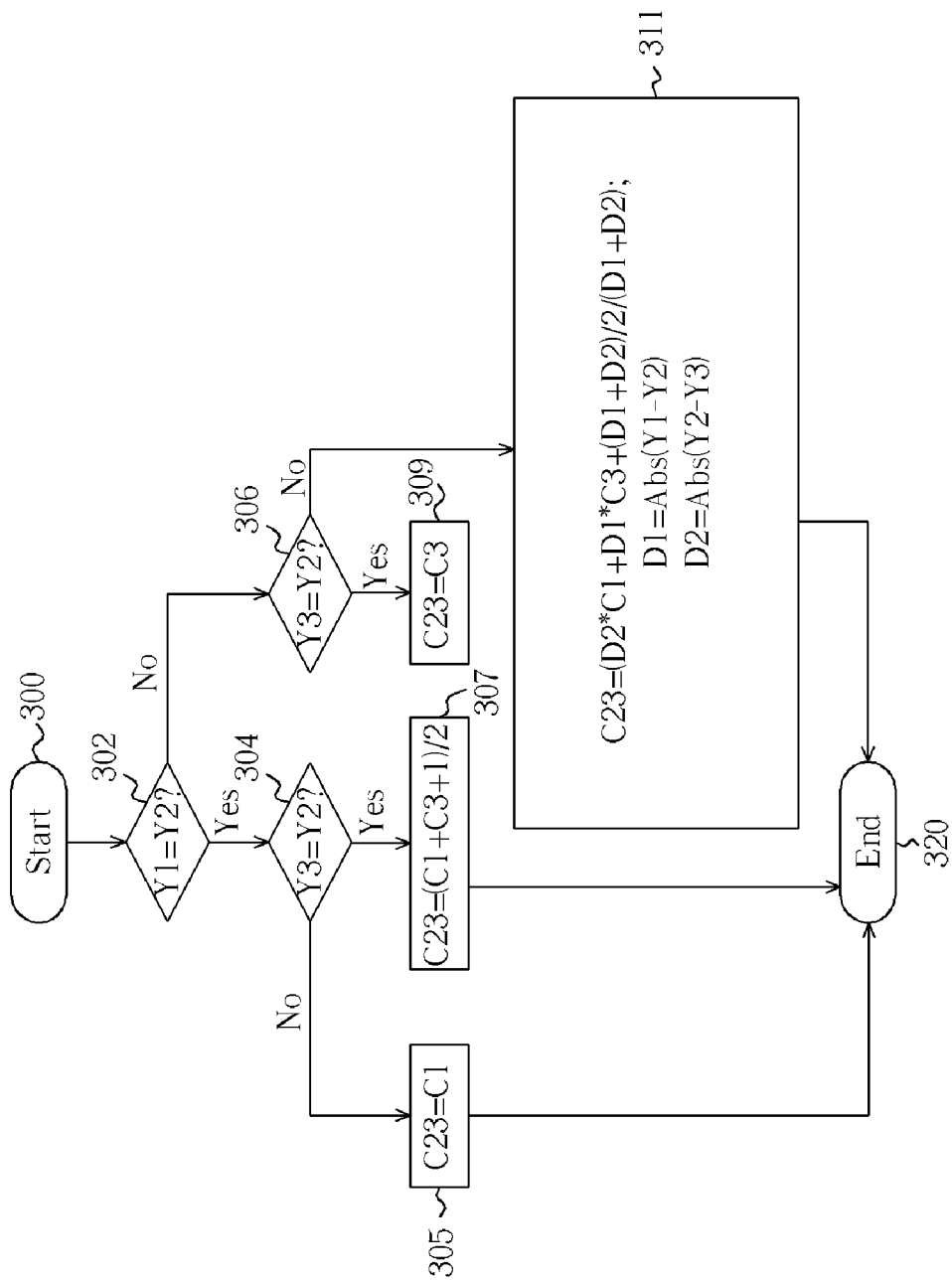
FIG. 3 is a flow chart of the chroma upscaling method of the present invention.

Please refer to FIG. 3. FIG. 3 is a flow chart of the chroma upscaling method of the present invention. In the preferred embodiment, the target pixel 12 of FIG. 1 continues to be a target pixel 12 for chroma upscaling, and the reference pixels 11, 13 neighboring the target pixel 12 continue to be reference pixels 11, 13. A target pixel chroma C23 of the target pixel 12 is set based on chroma values C1, C3 of the two reference pixels 11, 13, respectively. However, unlike the prior art, the present invention method takes into consideration a relationship between lumas Y1, Y3 of the reference pixels 11, 13 and a luma Y2 of the target pixel 12 to set a weight. The target pixel chroma C23 represents the chroma value obtained by the method of the present invention.

The present invention method comprises the following steps:

Step 300: Start;

Step 302: Measure the relationship between the luma Y1 of the reference pixel 11 and the luma Y2 of the target pixel 12, and proceed to Step 304 if the luma Y1 is equal to the luma Y2; else, if the luma Y1 is not equal to the luma Y2, proceed to Step 306;

Step 304: Measure the relationship between the luma Y3 of the reference pixel 13 and the luma Y2 of the target pixel 12, and if the luma Y3 is equal to the luma Y2, proceed to Step 307; else, if the luma Y3 is not equal to the luma Y2, proceed to Step 305;

Step 305: Set the chroma C23 of the target pixel 12 to the chroma value C1 of the reference pixel 11;

Step 306: Measure the relationship between the luma Y3 of the reference pixel 13 and the luma Y2 of the target pixel 12, and if the luma Y3 is equal to the luma Y2, then proceed to Step 309; else if the luma Y3 is not equal to the luma Y2, then proceed to Step 311;

Step 307: Set the chroma C23 of the target pixel 12 to a mean of the chroma value C1 of the reference pixel 11 and the chroma value C3 of the reference pixel 13, as:

$$C23=(C1+C3+1)/2$$

Step 309: Set the chroma C23 of the target pixel 12 to the chroma value C3 of the reference pixel 13;

Step 311: According to a preset positive integer n, set the chroma C23 of the target pixel 12 per the formula:

$$C23=(D2*C1+D1*C3+(D1+D2)/2)/(D1+D2);$$

where $D1=Abs(Y1-Y2)$, and $D2=Abs(Y2-Y3)$; and

Step 320: End.

Figure 4:
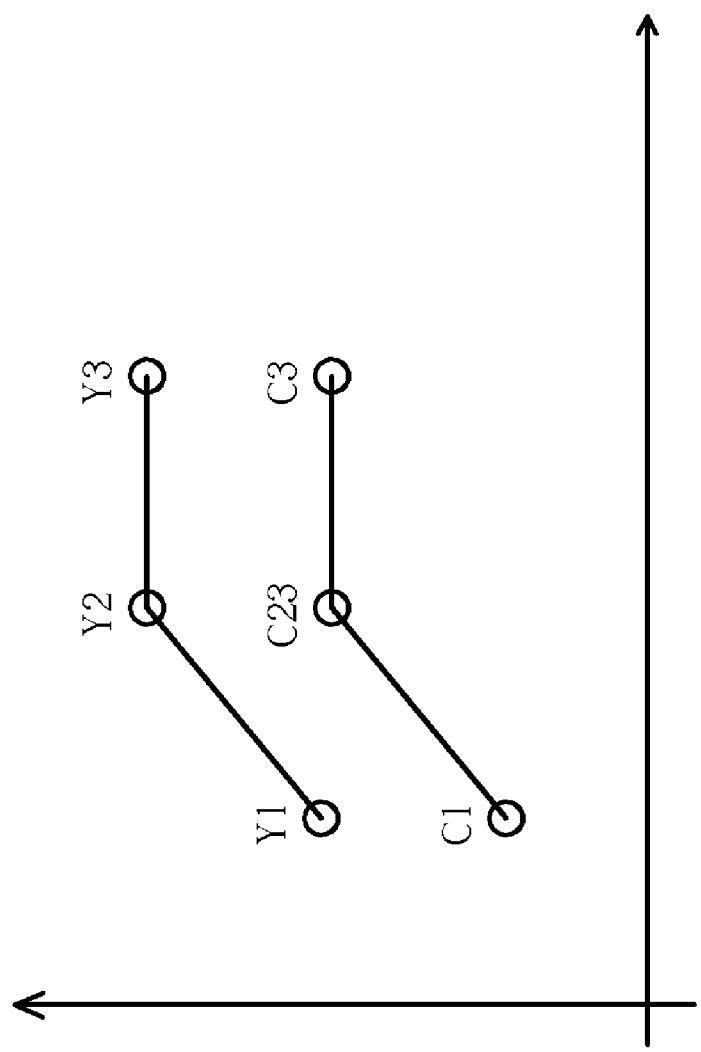
FIG. 4 is a graph of lumas of three pixels and chromas of three pixels after chroma upscaling per the method of the present invention.

Please refer to FIG. 4. FIG. 4 is a graph of the luma information Y1, Y2, Y3 of the respective reference pixel 11, target pixel 12, and reference pixel 13, and the respective chroma information C1, C23, C3 after performing the chroma upscaling method of the present invention. Because the luma Y2 of the target pixel 12 equals the luma Y3 of the reference pixel 13, and does not equal the luma Y1 of the reference pixel 11, according to the preferred embodiment of the chroma upsampling method of the present invention shown in FIG. 3, the chroma 23 of the target pixel 12 is set to the chroma C3 of the reference pixel 13.

The chroma upscaling method shown in FIG. 3 above takes into account the relationship between the lumas of the reference pixels and the target pixel, effectively addressing the fact that the trend in pixel-to-pixel chroma variation follows the trend in pixel-to-pixel luma variation, such that a signal that undergoes the chroma upscaling method of the present invention exhibits an improved visual effect. However, in light of the fact that Step 311 requires a high-cost division operation, the present invention provides a second embodiment (see FIG. 5) of the chroma upscaling method, which has a lower cost due to an alternate calculation that does not use division.

Figure 5:
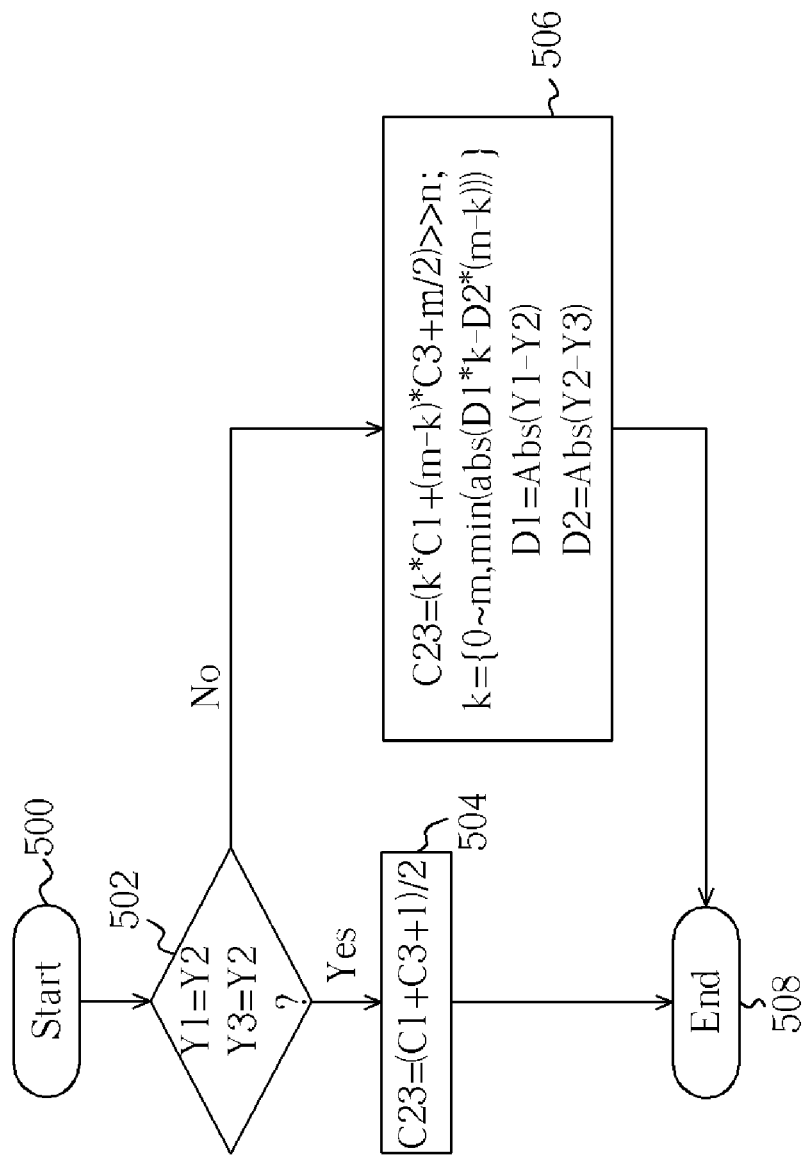
FIG. 5 is a flow chart of a second embodiment of the chroma upscaling method of the present invention.

Please refer to FIG. 5. FIG. 5 is a flow chart for a second embodiment of the present invention chroma upscaling method. The chroma C23 of the target pixel 12 is obtained from the method. The method shown in FIG. 5 comprises the steps:

Step 500: Start;

Step 502: Measure the relationship between the luma Y1 of the reference pixel 11 and the luma Y2 of the target pixel 12, and measure the relationship between the luma Y3 of the reference pixel 13 and the luma Y2 of the target pixel 12; if the luma Y1 equals the luma Y2, and the luma Y2 equals the luma Y3, then proceed to Step 504; else, proceed to Step 506;

Step 504: Set the chroma C23 of the target pixel 12 to the second-order FIR interpolation between the chroma value C1 of the reference pixel 11 and the chroma value C3 of the reference pixel 13, as:

$$C23=(C1+C3+1)/2;$$

Step 506: Set the chroma C23 of the target pixel 12 according to a preset integer n and the following formula:

$$C23=(k*C1+(m-k)*C3+m/2)>>n$$

where, $m=2^n$, $k=\{0\sim m, \min(abs(D1*k-D2*(m-k)))\}$, $D1=Abs(Y1-Y2)$, $D2=Abs(Y2-Y3)$, and ">>n" indicates shifting n bits to the right; and Step 508: End.

The second embodiment of the chroma upscaling method of the present invention shown in FIG. 5 also uses a plurality of reference pixels to set a chroma of a neighboring target pixel, and performs chroma upscaling based on a relationship between a luma of the reference pixels and a luma of the target pixels. However, the second embodiment of the present invention chroma upscaling method of FIG. 5 directly replaces the "divide by $2^n$" division operation with "shift n bits to the right" in Step 506, which is performed when the luma of the target pixel is not equal to the luma of the reference pixel, effectively reducing the complexity of an arithmetic processing circuit. The integer n can be 2, 3, or any other positive integer.

In conclusion, the present invention provides a method of chroma upscaling that uses a relationship between a luma of a plurality of reference pixels and a luma of a target pixel to set a chroma of the target pixel, and also assigns a weight to a chroma of the plurality of reference pixels based on the relationship between the luma of the reference pixels and the luma of the target pixel. Further, the present invention chroma upscaling method can be further simplified by removing a division operation required in calculating the chroma of the target pixel, subsequently simplifying a circuit performing the calculation of the chroma of the target pixel. Existing simulations and experiments of the present invention chroma upscaling method show that the chroma upscaling method is able to make the chroma change trend of the pixels undergoing chroma upscaling per the present invention method closely follow the luma change trend of the pixels, resulting in a superior visual effect.

In the embodiments described above, the first reference pixel, the target pixel, and the second reference pixel can be three neighboring pixels in a same row, or the first reference pixel, the target pixel, and the second reference pixel can also be three neighboring pixels in three different rows.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chroma upscaling method comprising:

comparing a luma Y1 of a first reference pixel and a luma Y2 of a target pixel for equality, and comparing a luma Y3 of a second reference pixel and the luma Y2 of the target pixel for equality; and if the luma Y1 of the first reference pixel is not equal to the luma Y2 of the target pixel and the luma Y2 of the target pixel is not equal to the luma Y3 of the second reference pixel, setting a chroma C2 of the target pixel based on a chroma C1 of the first reference pixel and a chroma C3 of the second reference pixel, as:

$C2=(k*C1+(m-k)*C3+m/2)>>n;$ wherein n is a positive integer, m=$2^n$, ">>" represents a shift calculation, and $k=\{0\sim m, \min(abs(D1*k-D2*(m-k)))\},$ where D1=Abs(Y1−Y2), D2=Abs(Y2−Y3).

2. The method of claim 1, wherein the first reference pixel, the target pixel, and the second reference pixel are neighboring pixels.

3. The method of claim 2, wherein the first reference pixel, the target pixel, and the second reference pixel are neighboring pixels in a same row.

4. The method of claim 2, wherein the first reference pixel, the target pixel, and the second reference pixel are neighboring pixels from a plurality of neighboring rows.

5. The method of claim 1, wherein the positive integer n is 2.

6. The method of claim 1, wherein the positive integer n is 3.

7. The method of claim 1, wherein the positive integer n is 4.

8. A chroma upscaling method comprising:

comparing a luma Y1 of a first reference pixel and a luma Y2 of a target pixel for equality, and comparing a luma Y3 of a second reference pixel and the luma Y2 of the target pixel for equality; and if the luma Y1 of the first reference pixel is not equal to the luma Y2 of the target pixel and the luma Y2 of the target pixel is not equal to the luma Y3 of the second reference pixel, setting a chroma C2 of the target pixel based on a chroma C1 of the first reference pixel and a chroma C3 of the second reference pixel, as:

$C2=(D2*C1+D1*C3+(D1+D2)/2)/(D1+D2);$ wherein D1=Abs(Y1−Y2), and D2=Abs(Y2−Y3).

9. The method of claim 8, wherein the first reference pixel, the target pixel, and the second reference pixel are neighboring pixels.

10. The method of claim 9, wherein the first reference pixel, the target pixel, and the second reference pixel are neighboring pixels on a same line.

11. The method of claim 9, wherein the first reference pixel, the target pixel, and the second reference pixel are neighboring pixels from a plurality of neighboring rows.

* * * * *